United States Patent Office 3,510,425
Patented May 5, 1970

3,510,425
OIL MIST LUBRICATION PROCESS AND NOVEL
LUBRICATING OIL COMPOSITION FOR USE
THEREIN
Timothy C. Wilson, 5520 5th Ave.,
Pittsburgh, Pa. 15232
No Drawing. Filed June 23, 1967, Ser. No. 648,233
Int. Cl. C10m 1/48, 1/28; C09k 3/30
U.S. Cl. 252—46.6         6 Claims

ABSTRACT OF THE DISCLOSURE

Novel mineral lubricating oil compositions are prepared for special use as mist oils. A mineral lubricating oil containing from about 0.05 to about 3.5 wt. percent of a polyester (80,000–150,000 number average molecular weight) of at least one $C_{12}$ to $C_{20}$ alkyl monohydric alcohol esterified with acrylic acid or methacrylic acid is converted into an aerosol, pneumatically transported in that form to a zone to be lubricated, and reclassifying said aerosol in said zone so as to coalesce at least 90% of the oil droplets within said lubrication zone.

---

The present invention is related to improvements in the preparation and use of mineral lubricating oils primarily designed for use in oil mist or microfog lubrication systems. At the present time there is a growing need for, and use of, mist lubrication systems for the lubrication of bearings and sliding surfaces in which two or more metallic surfaces are in frictional contact with one another. Mist lubrication systems provide economically continuous lubrication cooling and prevention of contamination while using a minimum amount of lubricant and giving a high reliability in the lubrication of such metal to metal contacts because of lack of moving parts and low system pressures in conveying the oil to the points requiring lubrication. The microfog or oil mist lubrication systems produce a dense concentration of small oil particles usually of the order of from 0.35 to 2.5 microns in diameter; which particles are pneumatically conveyed through piping distribution systems and are then dispensed, in that aerosol form, through metering devices or orifices and finally are delivered to the point or zone where the lubrication is required at which point the aerosol is reclassified so as to coalesce the fine oil droplets and to reconstitute at that point a mineral oil composition in continuous liquid phase.

Essentially, there are two basic problems involved in such systems. One is to achieve an oil mist or microfog of oil droplets, as an aerosol, wherein the oil has been, to a sufficient extent, misted or fogged so as to remain in aerosol form. The second problem is delivery, at the point of lubrication, in substantially unchanged form, of such aerosols without undue coalescence or condensation of the oil droplets at some intermediate point. As a corollary to the second point, it is equally important that once the oil aerosol has reached the point where the lubrication by means of mineral oil is desired, the oil aerosol must be capable of having its oil droplets coalesced so completely, by means of reclassification or in a so-called reclassifier, that the amount of noncoalesced droplets is reduced to a substantial minimum. Otherwise, the noncoalesced oil droplets are released to the atmosphere resulting in waste of lubricating oil, health hazards because of the possibility of breathing oil fumes by the workers in the plants using such systems, and finally, because of the potential fire hazards occasioned by these micro oil droplets remaining in aerosol form in the atmosphere.

Other problems arise as well, due to the fact that, in the past, various types of additives have been tried in these oil compositions in order to achieve the above specified characteristics for the mist or fogging oils. If large oil particles are present in the aerosol, the size of the droplets will readily wet out or lubricate a bearing or other surface but also they will have a tendency to coalesce within the feeder pipe lines between the misting lubricator and the surfaces to be lubricated. On the other hand, if a very finely divided oil fog aerosol is produced, it is difficult to coalesce it by reclassification at the point where oil lubrication is desired and excessive fogging of the oil in the atmosphere (giving a smoke-like condition to the atmosphere) results with the aforementioned undesirable features. A suitable compromise is therefore necessary, but, the additives which have been heretofore employed have not been entirely successful in achieving the desired result. In many instances, polymers, copolymers and terpolymers of the types which have been used in ordinary lubricating oils for the improvement of viscosity index have either not remained soluble in the lubricating oil once it is converted into aerosol form or they have not been stable or have been too viscous when added in minor amounts so that the rate of delivery of the aerosol has been materially curtailed, that is, the delivery rate of the oil mist has been reduced and, finally, if the polymeric additive did not exhibit any of these undesirable characteristics, many times excessive fogging and stray mist, i.e., a lack of sutiable coalescence upon reclassification resulted. All of the above difficulties only highlight how exacting the requirements for a mist lubricating oil composition actually are. Mineral lubricating oils ordinarily employed as mist oils inherently are readily converted into aerosol form and are transported by the mist oil tubing conduits to the lubrication zones. The difficulty, basically and inherently, in such oils is that they do not readily lend themselves to reclassification or coalescence with the result that as much as 25% (and many times higher percentages) of the total oil transported by this means is lost in the atmosphere giving rise to the attendant difficulties and hazards heretofore mentioned. Mist or fog oils, after coalescence and reclassification, should give rise to no more than 10% oil loss due to stray misting or fogging. It has been found that such oil lubrication systems may be commercially satisfactorily operated if such stray misting is held below that figure.

Additives which have been unsuccessfully tried in amounts ranging from 0.5 upo to 1.5 wt. percent are such copolymers and terpolymers as polyisobutylene of a number average molecular weight of about 130,000, the copolymer of vinyl acetate and lorol fumarate, polylorol fumarate, the terpolymer of di-$C_8$ oxo fumarate, ditallow fumarate and vinyl acetate, the polymer produced according to Example 1 of U.S. Pat. 3,256,195, and the copolymer of vinyl acetate-N-vinyl pyrrolidone as well as various other types of polymeric additives most, if not all, of which have heretofore been employed in mineral lubricating oils mostly as viscosity index improvers. Such additives sometimes have been found very difficult, if not possible, to dissolve in the mist oil or, if they did dissolve, they separated out upon conversion of the mist oil into an aerosol, or, because of their high viscosity, the delivery rate of the aerosol mist was greatly reduced or, in some cases, no advantageous reduction in the amount of stray mist at the point of lubrication was effected.

There are several forms of commercial mist lubricators available. In all cases, the oil fog or mist is produced by passing compressed air through the lubricator containing the oil. The larger oil particles produced are thrown against a baffle and returned to the oil reservoir while the smaller oil particles (usually about 10% of the oil originally atomized) enters the distribution lines as an oil fog or mist containing oil droplets of the aforementioned micron diameters. Because of the air molecules adsorbed on the surfaces of these tiny particles of oil, they remain stable and dispersed except in regions where there is high kinetic energy. Hence, when they are pneumatically conveyed through the oil distribution lines, they have little tendency to wet out or coalesce in these conveying pipe lines so long as their velocity is kept sufficiently low. Usually, such oil mist production and distribution systems are operated at superatmospheric pressures generally between about 25 and about 80 p.s.i.g. A portion of the air introduced into the lubricator generally by-passes the oil reservoir and is used for conducting the oil aerosol through the conveying pipe work and the rest of the air introduced flows through the venturi nozzle of the fog producing portion of the lubricator. The oil aerosol, once it reaches the zone of desired lubrication, must be reclassified or coalesced insofar as the oil droplets are concerned and this is done by accelerating the velocity of the oil particles through a nozzle or reclassifier and impinging them onto the internal surfaces of the nozzle. If particles smaller than about 0.3 microns in diameter are present in the oil aerosol at the point of lubrication, the high velocities necessary for reclassification (wetting out) are generally not attainable in practice and the particles remain in a state of stable dispersion and the stray mist or free fog condition, which is so undesirable, is then present. This is sometimes avoided by increasing the sprayng pressure of the lubricator which does in fact, reduce the amount of free fog or stray mist but this carries with it the penalties of undesired increased output of the lubricator and, with some degree, more oil coalescence in the conveying pipe lines. It also results in the delivery to the surfaces to be lubricated of a greater amount than required of the lubricating oil thus resulting in uneconomical usage of oil.

It has now been discovered that the vast majority of the aforementioned difficulties and undesirable characteristics of mist oils may be overcome while retaining the desired characteristics and advantages of mist oils by the addition to conventionally employed mist oils of from 0.05 to about 3.5 wt. percent, preferably between about 0.5 and about 1.5 wt. percent, of a polyester or a mixture of polyesters having from 80,000 to 150,000 number average molecular weight in which the mixed monoesters are formed by the esterification of acrylic acid or methacrylic acid with one or a mixture of two or more of $C_{12}$–$C_{20}$ alkyl monohydric alcohols, or a mixture of a short chain $C_1$–$C_6$ alkyl monohydric alcohol with said $C_{12}$–$C_{20}$ alcohol. The esters may be separately formed and then they may be copolymerized with each other. Typical specific alcohols that may be employed are the following: methyl, ethyl, butyl, allyl, amyl alcohols and decyl alcohol, dodecyl alcohol, lauryl alcohol,myristyl alcohol, cetyl alcohol, octadecyl alcohol, mixtures of alcohols such as lorol alcohol which is a mixture of normal $S_{12}$, normal $C_{14}$, and normal $C_{16}$ alkyl alcohols, mixed alkyl alcohols derived from cocoanut oil or from tallow, and the $C_{12}$ or longer chain alkyl oxo alcohols. Also, a $C_1$–$C_6$ alkyl methacrylate may be copolymerized with a $C_{12}$–$C_{10}$ alkyl methacrylate. Preferably the esters involve the use of methacrylic acid although it is contemplated that so long as the molecular weight of the polymer is between about 8,000 and about 150,000, preferably between about 95,000 and about 110,000, any of the $C_{12}$–$C_{20}$ alkyl acrylic acid esters may be employed. These polymers and their process of production are disclosed in U.S. Patent No. 2,125,885 which disclosure is incorporated herein by reference. The polymers heretofore employed in connection with mist oils for the purpose of cutting down stray misting were either partially or completely insoluble when the oil was present in the aerosol form, resulted in a reduced delivery rate of aerosol, or failed in large measure to coalesece upon reclassification. The use of these acrylate and methacrylate polymers has proved to be unexpectedly beneficial. In no instance has there been as much as 10% stray misting or free fogging after reclassification of the oil at the lubrication zone.

In general, any of the heretofore employed commercially available oils sold for the purpose of mist lubrication and application are employed in the present invention. Such oils may vary in viscosity all the way from 50 up to as high as 3500 SSU (Saybolt Seconds Universal) at 100° F., preferably between about 500 and about 2500 SSU at 100° F. In general, however, if an oil is employed having a viscosity of greater than 1,000 SSU at 100° F., heaters are employed either on the air intake line of the lubricator or contained in the oil reservoir of the lubricator or in both places. Aside from this limitation or requirement, almost any oil of paraffinic, naphthenic, aromatic, or mixed type, which is customarily employed for the lubrication of sliding surfaces, bearings, or gears can be used and can have advantageously added to it the aforementioned polymeric esters.

Typical specific mist oils are the following:

Oil A was constituted as a blend of two oils, 25.5% of a propane deasphalted, solvent-extracted, solvent-dewaxed, hydrofined residuum (bright stock) from paraffinic crude (1) having a 15° F. pour point, 575° F. flash point, 155 SSU at 210° F. viscosity, and the balance being Stanco 450, a solvent-extracted, solvent-dewaxed, hydrofined distillate from paraffinic crude (2) which has a pour point of 30° F., a flash point of 465° F., and a viscosity of 61 SSU at 210° F.

Oil B constituted a blend of A (1) and (2) wherein (1) was present in the amount of about 52%, the remainder being component A (2). The compounded blend had a viscosity of about 1,000 SSU at 100° F.

Oil C was a blend of A (1) and (2) wherein (1) constituted only about 15.5 wt. percent of the blend, the balance being component A (2). The compounded blend had a viscosity of about 1500 SSU at 100° F.

Oil D was a blend of the same two base oils as comprised oil A with (1) being present in the amount of about 92.5 wt. percent, the balance being base oil A (2). Its viscosity, when compounded, was about 2100 and about 2200 SSU at 100° F.

Oil E was a blend of about 70.0 wt. percent of a hydrofined distillate of Texas Coastal naphthenic crude (1) of −30° F. pour point, 390° F. flash point and viscosity of 300 SSU at 100° F., the balance being the same type of oil as the 70.0 wt. percent except that it was a heavier fraction (2) of 1200 SSU at 100° F., 450° F. flash point and 0° F. pour point. The compounded blend had a viscosity of about 460 SSU at 100° F.

Oil F constituted an oil blend of about 85.0 wt. percent of oil E (1) with the balance being of the same type and having 82 SSU viscosity at 100° F., a flash point of 325° F. and a pour point of −40° F. (2). The compounded blend had a viscosity of about 300 SSU at 100° F.

Oil G was composed entirely of naphthenic lube oil F (2). When compounded with the extreme pressure additives, it had a viscosity of about 100 SSU at 100° F.

In the following examples, oils A through G (above identified) had added thereto 4.5 wt. percent of a conventional, commercially available, phosphorized, sulfurized, extreme pressure, oil additive concentrate (Anglamol 81) commonly used in automotive hydromatic and gear oils. The viscosities shown in the following table for the compounded oil blends, or in the case of oil G, for the single oil, were determined after the addition of this extreme pressure additive.

Another extreme pressure additive that could be used is prepared by sulfurizing a fatty ester oil such as sperm oil to a sulfur content of about 13.5 wt. percent. It is then treated with an organic (alkyl) phosphorus ester in an amount of about 10 wt. percent in the range of 450°–500° F. and finally contains 4.0 to 4.5 wt. percent of phosphorus. The sulfurization of the sperm oil is carried out by stirring the sperm oil at 250° F. in the presence of 13 wt. percent of sulfur and then raising the temperature to 380°–385° F. over a period of 30–40 minutes and holding at this temperature for an additional 1½ hours while stirring is conducted. The phosphorus ester may then be added, or an equivalent type of base additive can be prepared by adding 1 wt. percent of P₄S₃ to the sperm oil and heating for 8 hours at 215° F. Lard oil may be substituted for the sperm oil and it may be sulfurized with 6% sulfur monochloride plus 8 wt. percent of sulfur followed by heating for 7 hours at 325°–330° F. after which 0.6 wt. percent of P₄S₃ is added and the mixture stirred at 220°–225° F. for 5 hours at a gauge pressure of about 5 lbs. The phosphosulfurized lard oil or phosphosulfurized sperm oil may be added directly to any of the mist oils A through G (above identified) or it may be in the form of a concentrate containing from 65 to 70 wt. percent additive in a diluent or vehicle mineral oil and, in that form, added to the mist oils.

Various other types of additives may also be employed in these mist oils for the purpose of giving them specialized usage, for example, extreme pressure lubricants, sludge dispersant lubricants, viscosity index improved lubricants, etc. Thus, any of the conventional additives such as tricresyl phosphate, chlorinated paraffin wax, zinc di-$C_4$–$C_5$ alkyl dithiophosphate, calcium or barium petroleum sulfonates, etc. may be added in the conventionally used quantities. None of these additives, it has been found, has any effect upon the mist oil characteristics heretofore discussed. Strangely, the variations in viscosity did not affect the degree of stray mist or free fog encountered. It is contemplated that various additives which have heretofore been conventionally employed in lubricating oils to achieve increased antioxidant properties, sludge dispersant properties, antiwear properties, extreme pressure properties, or the like may be incorporated into these mist oils dependent upon the specific purpose for which the oils are to be used.

EXAMPLES

Oils A through G each containing 4.5 wt. percent of Anglamol 81 concentrate and, except for Examples 1, 4 and 8, each containing 1 wt. percent of a mixed polymeric ester of octadecyl methacrylate and lauryl methacrylate having a number average molecular weight of about 100,000, were placed in separate tests in an Alemite 100 Bearing Inch mist lubricator having a designed delivery rate of 0.4 cubic inch of oil per hour per cubic foot per minute of air (about 0.053 lb. per hour of oil), running at 4 cubic ft. per minute of air at ambient or the indicated temperature. Each test was carried out for 16 hours and the mist lubricator conveying lines were attached to three spray nozzles (reclassifiers). The system was run under a manifold (conveying lines) pressure of 20 inches of water. The figures obtained were for the total delivered condensate of the three spray nozzles. In the following table, the amount of oil shown in the column headed "stray mist" was determined as a difference between the weight of the oil output of the lubricator and the weight of the oil delivered and coalesced by the reclassifiers (spray nozzles) together with the weight of the condensed oil collected in the delivery (manifold) lines. The table also shows three of the runs carried out with a base mist oil but without any polymethacrylate additive. Ambient air temperature at the time of the test was about 75° F. The results are shown in the following table:

TABLE I

| Example No. | Base oil | Additive, Wt. percent | Inlet air temp., ° F. | Compounded oil approximate viscosity SSU at 100° F. | Lubricator delivery rate, lbs./hr. | Wt. percent oil removed from lubricator | | |
|---|---|---|---|---|---|---|---|---|
| | | | | | | Line Condensed | Coalesced | Stray mist |
| 1 | A | None | Ambient | 700 | 0.058 | 6 | 71 | 23 |
| 2 | A | 1.0 | Ambient | 700 | 0.043 | 16 | 76 | 8 |
| 3 | A | 1.0 | 150 | 700 | 0.110 | 19 | 77 | 4 |
| 4 | B | None | 150 | 1,000 | 0.115 | 9 | 66 | 25 |
| 5 | B | 1.0 | 150 | 1,000 | 0.105 | 18 | 76 | 6 |
| 6 | C | 1.0 | 150 | 1,500 | 0.099 | 18 | 76.5 | 5.5 |
| 7 | D | 1.0 | 175 | 2,100 | 0.103 | 16 | 82 | 2 |
| 8 | E | None | Ambient | 460 | 0.074 | 3.5 | 74 | 22.5 |
| 9 | E | 1.0 | Ambient | 460 | 0.055 | 16.8 | 77.5 | 5.7 |
| 10 | F | 1.0 | Ambient | 300 | 0.075 | 15.7 | 73.2 | 11.1 |
| 11 | G | 1.0 | Ambient | 100 | 0.097 | 18.4 | 73.9 | 7.7 |

Each of the four specific base mist oils A through D was run using 1% of terpolymer of di-$C_8$ oxo fumarate, ditallow fumarate, and vinyl acetate with a very small amount of ethylol methacrylate being added in place of the 1% mixed lauryl-octa-decyl methacrylate polymer and under strictly comparative conditions. In some instances, although the precentage of stray mist oil was about the same or not substantially greater than when using the methacrylate polyester, either the amount of line condensed oil or the stray mist oil or both was greater or the delivery rate was less than when using the methacrylate polymer. The above set forth data show a vastly superior performance in th total minimizing of stray mist and increasing delivery rate using 1% of the methacrylate polymer as compared to the use of no such polymer or a like amount of the aforementioned terpolymer.

Having now thus fully described and illustrated the characteristics and general nature of the invention, what is desired to be secured by Letters Patent is:

1. A process of lubrication which comprises converting into an aerosol a mixture of a mineral lubricating oil containing between about 0.05 and about 3.5 wt. percent of an oil soluble polyester of between about 80,000 and about 150,000 number average molecular weight of at least one $C_{12}$–$C_{20}$ alkyl monohydric alcohol esterfied with a mono-unsaturated monocraboxylic acid selected from the group consisting of arylic acid and methacrylic acid, pneumatically conducting said aerosol to a zone to be lubricated, and reclassifying said aerosol in said zone whereby at least 85% of the oil droplets of the aerosol are coalesced within said lubrication zone.

2. A process as in claim 1 wherein the polyester has a number average molecular weight of about 100,000 and the aerosol contains oil droplets of between about 0.5 and about 2.0 microns in diameter.

3. A process as in claim 2 wherein the polyester is used in an amount of between about 0.5 and about 1.5 wt. percent and the mineral lubricating oil has a viscosity of between about 50 and about 3500 SSU at 100° F.

4. A process as in claim 2 wherein the polyester is a polymerized mixed ester of octadecyl methacrylate and lauryl methacrylate.

5. A process as in claim 4 wherein the oil composition contains an extreme pressure additive.

6. A process as in claim 5 wherein the extreme pressure additive is a phosphosulfurized fatty oil.

(References on following page)

References Cited

UNITED STATES PATENTS

| | | | |
|---|---|---|---|
| 1,993,316 | 9/1931 | Blackwood et al. | 252—305 |
| 2,211,306 | 8/1940 | Whittier et al. | 252—46.6 |
| 2,489,671 | 11/1949 | Revukas | 252—56 |
| 2,664,173 | 12/1953 | Karig | 252—15 |
| 3,252,949 | 5/1966 | Fields et al. | 152—56 |
| 2,091,627 | 8/1937 | Bruson | 252—56 |
| 3,057,433 | 10/1962 | Rusche. | |

OTHER REFERENCES

J. T. Chapman, Some Aspects of Lubricant Development of Centralized Aerosol Lubricating Systems, Scientific Lubrication (London) 18 (3) 23–4, 26–8 (1966).

DANIEL E. WYMAN, Primary Examiner

J. M. HICKEY, Assistant Examiner

U.S. Cl. X.R.

252—56, 305